US012026347B2

(12) United States Patent
Yi

(10) Patent No.: US 12,026,347 B2
(45) Date of Patent: Jul. 2, 2024

(54) METHOD FOR DISPLAYING MULTIPLE APPLICATION WINDOWS BY MOBILE TERMINAL, AND MOBILE TERMINAL

(71) Applicant: HUAWEI TECHNOLOGIES CO., LTD., Guangdong (CN)

(72) Inventor: Hui Yi, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/727,286

(22) Filed: Apr. 22, 2022

(65) Prior Publication Data

US 2022/0244814 A1 Aug. 4, 2022

Related U.S. Application Data

(63) Continuation of application No. 16/065,262, filed as application No. PCT/CN2015/098783 on Dec. 24, 2015, now Pat. No. 11,620,029.

(51) Int. Cl.
*G06F 3/0481* (2022.01)
*H04M 1/724* (2021.01)

(52) U.S. Cl.
CPC .......... *G06F 3/0481* (2013.01); *H04M 1/724* (2021.01); *G06F 2200/1614* (2013.01); *G06F 2203/04803* (2013.01)

(58) Field of Classification Search
CPC ......... G06F 3/0481; G06F 2203/04803; G06F 2200/1614; H04M 1/724; H04M 1/72454; H04M 1/725
See application file for complete search history.

(56) References Cited

U.S. PATENT DOCUMENTS

| 8,665,215 B2 | 3/2014 | Schrock et al. |
| 10,921,967 B2 * | 2/2021 | Jeong .................... G06F 3/0346 |
| 2004/0260678 A1 | 12/2004 | Verbowski et al. |

(Continued)

FOREIGN PATENT DOCUMENTS

| CN | 102999253 | 3/2013 |
| CN | 103067569 | 4/2013 |

(Continued)

OTHER PUBLICATIONS

EPO Decision to refuse a European Patent Application issued in European Application No. 15911154.1 on Oct. 15, 2021, 19 pages.

(Continued)

*Primary Examiner* — Nicholas Ulrich
(74) *Attorney, Agent, or Firm* — Fish & Richardson P.C.

(57) ABSTRACT

The present disclosure relates to methods and mobile terminals for displaying multiple application windows. One example method includes determining a window width and a window height of a first application window in a current placement direction. If a value relationship between the window width and the window height is that the window width is greater than the window height, loading a landscape display resource of the first application in the current placement direction. If a value relationship between the window width and the window height is that the window width is less than the window height, loading a portrait display resource of the first application in the current placement direction.

14 Claims, 11 Drawing Sheets

(56) References Cited

U.S. PATENT DOCUMENTS

| | | | |
|---|---|---|---|
| 2010/0088634 A1 | 4/2010 | Tsuruta et al. | |
| 2012/0117504 A1 | 5/2012 | Lemay et al. | |
| 2012/0198344 A1 | 8/2012 | Tukol et al. | |
| 2012/0225694 A1 | 9/2012 | Sirpal et al. | |
| 2013/0125045 A1* | 5/2013 | Sun | G06F 3/04883 715/788 |
| 2013/0227469 A1 | 8/2013 | Park | |
| 2014/0253779 A1 | 9/2014 | Park | |
| 2014/0325434 A1 | 10/2014 | Chang et al. | |
| 2015/0074589 A1 | 3/2015 | Pan et al. | |
| 2015/0113455 A1* | 4/2015 | Kang | G06F 3/04883 715/765 |
| 2015/0199092 A1 | 7/2015 | Kuscher et al. | |
| 2015/0317286 A1 | 11/2015 | Wang et al. | |
| 2016/0364121 A1* | 12/2016 | Ting | G06F 3/012 |
| 2019/0005615 A1 | 1/2019 | Brady et al. | |
| 2019/0179489 A1 | 6/2019 | Townsend et al. | |

FOREIGN PATENT DOCUMENTS

| | | | |
|---|---|---|---|
| CN | 103279517 | 9/2013 | |
| CN | 103472997 | 12/2013 | |
| CN | 103677538 | 3/2014 | |
| CN | 103970417 | 8/2014 | |
| CN | 104423794 | 3/2015 | |
| CN | 104461242 | 3/2015 | |
| CN | 104571843 | 4/2015 | |
| CN | 104615336 | 5/2015 | |
| CN | 104932852 | 9/2015 | |
| CN | 105094762 | 11/2015 | |
| CN | 107251536 | 6/2019 | |
| EP | 1562105 A2 * | 8/2005 | F24F 6/14 |
| EP | 2626772 A1 * | 8/2013 | G06F 1/1626 |
| JP | 2006078750 | 3/2006 | |
| JP | 2013546050 | 12/2013 | |
| JP | 2014003378 | 1/2014 | |
| JP | 2015507264 | 3/2015 | |
| JP | 2018533187 | 11/2018 | |
| JP | 6759341 B2 | 9/2020 | |
| KR | 20130099720 | 9/2013 | |
| KR | 20150060612 | 6/2015 | |
| KR | 20150060754 | 6/2015 | |
| KR | 20150060825 | 6/2015 | |
| RU | 2477879 | 3/2013 | |
| RU | 2536799 | 12/2014 | |
| WO | WO2008090902 | 7/2008 | |
| WO | WO2013010146 | 1/2013 | |
| WO | WO-2013073906 A1 * | 5/2013 | G06F 3/0481 |

OTHER PUBLICATIONS

Extended European Search Report issued in European Application No. 15911154.1 on Nov. 26, 2018, 10 pages.
Office Action issued in Chinese Application No. 201580076771.1 on Mar. 5, 2019, 5 pages.
Office Action issued in Chinese Application No. 201910483741.2 on Jan. 13, 2021, 7 pages (with English translation).
Office Action issued in Chinese Application No. 201910483741.2 on Jun. 2, 2020, 17 pages (with English translation).
Office Action issued in Japanese Application No. 2018-533187 on Aug. 27, 2019, 15 pages (with English Translation).
Office Action issued in Japanese Application No. 2020-147179 on Jul. 20, 2021, 9 pages (with English translation).
Office Action issued in Korean Application No. 2018-7021047 on Mar. 9, 2020, 14 pages (with English translation).
Office Action issued in Russian Application No. 2018126960, on May 28, 2019, 13 pages (with English translation).
PCT International Search Report and Written Opinion issued in International Application No. PCT/CN2015/098783 on Sep. 28, 2016, 13 pages (with English translation).
Stackoverflow.com [online] "Detect viewport orientation, if orientation is Portrait display alert message advising user of instructions," Blog post, retrieved on Nov. 9, 2020, retrieved from URL: <https://stackoverflow.com/questions/4917664/detect-viewport-orientation-if-orientation-is-portrait-display-alert-message-ad>, Initial question posed Feb. 7, 2011; multiple answers including on Feb. 7, 2011, Mar. 12, 2014, 16 pages.
TheFreeDictionary.com [online], "Definitions of 'Support'," English definition, retrieved Nov. 12, 2021, retrieved from URL <https://www.thefreedictionary.com/support, Nov. 2021, 16 pages.
Office Action in Japanese Appln. No. 2020-147479, dated Sep. 6, 2022, 5 pages (with English translation).

* cited by examiner

Portrait direction (vertical placement)

Landscape direction (horizontal placement)

Portrait direction    Landscape direction

Landscape direction    Portrait direction

METHOD FOR DISPLAYING MULTIPLE APPLICATION WINDOWS BY MOBILE TERMINAL, AND MOBILE TERMINAL

CROSS-REFERENCE TO RELATED APPLICATIONS

This application is a continuation of U.S. patent application Ser. No. 16/065,262, filed on Jun. 22, 2018, which is a national stage of International Application No. PCT/CN2015/098783, filed on Dec. 24, 2015. Both of the aforementioned applications are hereby incorporated by reference in their entireties.

TECHNICAL FIELD

The present invention relates to the communications field, and in particular, to a method for displaying multiple application windows by a mobile terminal, and a mobile terminal.

BACKGROUND

Currently, a terminal generally has two placement directions: a landscape direction and a portrait direction. The terminal may detect whether the terminal is currently in the landscape direction or the portrait direction by using a sensor. As shown in FIG. 1, in the portrait direction, a height G is greater than a width K; and in the landscape direction, the height G is less than the width K.

In the prior art, when a terminal displays a user interface of an application, if the application has both a landscape display resource and a portrait resource, the terminal selects a proper display resource according to a current placement direction. For example, when the terminal is currently in a portrait placement direction, the terminal loads the portrait resource of the application; or when the terminal is currently in a landscape placement direction, the terminal loads the landscape resource of the application. Therefore, display of an application interface matches the placement direction of the terminal, and interface elements are properly laid out in different placement directions. An application on the terminal has a display attribute indicating whether a display direction of the application is limited. If the display direction is not limited, when the terminal is in the portrait direction, the terminal loads a portrait display resource for the application in the current placement direction; or when the terminal is in the landscape direction, the terminal loads a landscape display resource for the application in the current placement direction. If the display attribute of the application indicates that the display direction of the application is limited, the terminal loads a corresponding display resource only in a limited direction of the application. For example, if the display attribute of the application indicates that the limited display direction of the application is the landscape direction, even if the current placement direction of the terminal is the portrait direction, the terminal loads a display resource of the application in the limited display direction (that is, the landscape direction) of the application instead of loading the display resource in the portrait direction.

Usually, an application that has a display attribute indicating that a display direction is not limited has a landscape resource and a portrait resource, and an application that has a display attribute indicating that a display direction is limited has a display resource (a landscape resource or a portrait resource) corresponding to a limited display direction.

However, with maturity and application of a multi-window display technology, multiple windows may appear on one screen of the terminal. In the prior art, in a multi-window interface, the terminal still loads a corresponding display resource for each window according to the current placement direction of the terminal, but an actual display interface of each window may not match the loaded display resource. As shown in FIG. 2, the placement direction of the terminal is the portrait direction, and a window 1 and a window 2 are included on the screen of the terminal. The window 1 is a user interface of a browser, a width of the window 1 in the current placement direction (that is, the portrait direction) of the terminal is greater than a height, and a height of the window 2 in the current placement direction of the terminal is greater than a width. In this case, if the window 1 and the window 2 are displayed according to the placement direction of the terminal by using the prior art, because the placement direction of the terminal is the portrait direction, the terminal loads portrait resources in both the window 1 and the window 2 to display the user interface (as shown in the left figure in FIG. 2). It may be learned that all elements in the user interface in the window 1 are horizontally stretched. Consequently, the window 1 has a poor display effect. If a landscape display resource is loaded for the browser in the window 1, a display effect of the user interface is shown in the right figure in FIG. 2. An example that the placement direction of the terminal is the landscape direction and there is only the user interface of the browser on the terminal is used in the right figure in FIG. 2.

It may be learned that the prior-art method in which a corresponding display resource is loaded according to the placement direction of the terminal can no longer be applied to the multi-window display technology.

SUMMARY

Embodiments of the present invention provide a method for displaying multiple application windows by a mobile terminal, and a mobile terminal, so as to display multiple application windows on one display screen based on display resource statuses of the application windows.

To achieve the foregoing objective, the following technical solutions are used in the embodiments of the present invention:

According to a first aspect, an embodiment of the present invention provides a method for displaying multiple application windows by a mobile terminal, where the multiple application windows include at least a first application window and a second application window that are used to respectively display, on one display screen, a user interface of a first application and a user interface of a second application, and the method includes: obtaining a current placement direction of the mobile terminal; determining a window width and a window height of the first application window in the current placement direction; determining a value relationship between the window width and the window height, and determining a display resource status of the first application; and if the value relationship between the window width and the window height is that the window width is greater than the window height, and the display resource status of the first application is that the first application has a landscape display resource, loading the landscape display resource of the first application in the current placement direction when the user interface of the first application is displayed in the first application window; or if the value relationship between the window width and the window height is that the window width is less than the window height, and the display resource status of the first application is that the first application has a landscape display resource and a portrait display resource, loading the portrait display resource of the first application in the current placement direction when the user interface of the first application is displayed in the first application window.

In this way, the mobile terminal may allocate a corresponding landscape display resource or portrait display resource to the first application window based on the value relationship between the window width and the window height of the first application window in the current placement direction, so that a display resource can match a window according to an actual size of the window and the current placement direction of the mobile terminal, and an application has a better display effect.

In a possible design, the method further includes: if the value relationship between the window width and the window height is that the window width is greater than the window height, and the display resource status of the first application is that the first application has only a portrait display resource, loading the portrait display resource of the first application in the current placement direction when the user interface of the first application is displayed in the first application window; or if the value relationship between the window width and the window height is that the window width is less than the window height, and the display resource status of the first application is that the first application has only a landscape display resource, loading the landscape display resource of the first application in the current placement direction when the user interface of the first application is displayed in the first application window.

It may be learned that in a scenario of displaying multiple application windows, the mobile terminal may display the multiple application windows on one display screen based on display resource statuses of the application windows and according to the value relationship between the window width and the window height of the first application window in the current placement direction, so that a display resource can match a window according to an actual size of the window and the current placement direction of the mobile terminal, so as to provide a better display effect for a user.

In a possible design, the determining a display resource status of the first application includes: obtaining a display attribute of the first application, where the display attribute is used to indicate that a display direction of the first application is not limited or is limited; and determining, if the display attribute of the first application indicates that the display direction of the first application is not limited, that the first application has a landscape display resource and a portrait display resource; or determining, if the display attribute of the first application indicates that the display direction of the first application is limited, that the first application has only a display resource in a limited display direction, where the display resource in the limited display direction is a landscape display resource or a portrait display resource.

In a possible design, before the determining a display resource status of the first application, the method further includes: when the mobile terminal determines that the first application window and the second application window are to be simultaneously displayed on the display screen, and the display attribute of the first application indicates that the display direction of the first application is limited, changing the display attribute of the first application to an attribute indicating that the display direction is not limited, and recording the display attribute of the first application prior to the modification.

In a possible design, the determining, if the display attribute of the first application indicates that the display direction of the first application is not limited, that the first application has a landscape display resource and a portrait display resource is specifically: if the display attribute of the first application indicates that the display direction of the first application is not limited and is not modified, determining that the first application has a landscape display resource and a portrait display resource; or the determining, if the display attribute of the first application indicates that the display direction of the first application is limited, that the first application has only a display resource in a limited display direction is specifically: if the display attribute of the first application is modified, and the display attribute prior to the modification indicates that the display direction of the first application is limited, determining that the first application has only a display resource in the limited display direction.

In this way, the display direction of the first application window after the modification is a display direction that is not limited. Therefore, when the current placement direction of the mobile terminal changes, the mobile terminal may rotate the first application window, and preferentially obtain, according to a value that is of a first flag bit prior to the modification and is recorded in a second flag bit, the display resource that is in the limited display direction and is corresponding to the value of the first flag bit prior to the modification. Therefore, during display after the first flag bit is modified, the first application window can be freely rotated without being limited in the limited display direction. In addition, it is ensured that all other application windows located on the display screen the same as the first application window can be freely rotated.

In a possible design, the obtaining a display attribute of the first application includes: reading a value of a first flag bit in a configuration file of the first application, to obtain a display attribute of the first application window, where the first flag bit is used to indicate the display attribute of the first application window.

In a possible design, the configuration file further includes a second flag bit, and the changing the display attribute of the first application to an attribute indicating that the display direction is not limited, and recording the display attribute of the first application prior to the modification includes: changing the value of the first flag bit, so that a modified value of the first flag bit represents that the display attribute of the first application indicates that the display direction is not limited, and storing, in the second flag bit, the value of the first flag bit prior to the modification.

In a possible design, if the user interface of the first application and the user interface of the second application fully occupy an area used to display an application interface on the display screen, and the user interface of the first application and the user interface of the second application do not overlap, the method further includes: obtaining a display attribute of the first application, where the display attribute of the first application is used to indicate that a display direction of the first application is not limited or is limited; obtaining a display attribute of the second application, where the display attribute of the second application is used to indicate that a display direction of the second application is not limited or is limited; and adjusting a size of the first application window and a size of the second application window if the display attribute of the first application indicates that the display direction of the first application is limited, a limited display direction of the first application is a portrait direction, the display attribute of the second application indicates that the display direction of the second application is limited, and a limited display direction of the second application is a landscape direction, so that the window width of the first application window in the placement direction of the mobile terminal is less than the window height, and a window width of the second application window in the placement direction of the mobile terminal is greater than a window height.

In a possible design, after the obtaining a display attribute of the second application, the method further includes: adjusting a size of the first application window if the display attribute of the first application indicates that the display direction of the first application is limited, a limited display direction of the first application is a portrait direction, and the display attribute of the second application indicates that the display direction of the second application is not limited, so that the window width of the first application window in the placement direction of the mobile terminal is less than the window height; or adjusting a size of the first application window if the display attribute of the first application indicates that the display direction of the first application is limited, a limited display direction of the first application is a landscape direction, and the display attribute of the second application indicates that the display direction of the second application is not limited, so that the window width of the first application window in the placement direction of the mobile terminal is greater than the window height.

It should be noted that the user interface of the first application and the user interface of the second application do not overlap on the display screen.

According to a second aspect, an embodiment of the present invention provides a mobile terminal, including: a processor, a display screen, a memory, a bus, and a direction sensor, where the display screen includes at least a first application window and a second application window; the direction sensor is configured to: obtain a current placement direction of the mobile terminal, and send the current placement direction to the processor; and the processor is configured to: determine a window width and a window height of the first application window in the current placement direction, determine a value relationship between the window width and the window height, and determine a display resource status of the first application; and if the value relationship between the window width and the window height is that the window width is greater than the window height, and the display resource status of the first application is that the first application has a landscape display resource, load the landscape display resource of the first application in the current placement direction when a user interface of the first application is displayed in the first application window of the display screen; or if the value relationship between the window width and the window height is that the window width is less than the window height, and the display resource status of the first application is that the first application has a landscape display resource and a portrait display resource, load the portrait display resource of the first application in the current placement direction when a user interface of the first application is displayed in the first application window of the display screen.

The direction sensor may be specifically a gravity sensor or an acceleration sensor. No limitation is imposed in this embodiment of the present invention.

In a possible design, the processor is further configured to: if the value relationship between the window width and the window height is that the window width is greater than the window height, and the display resource status of the first application is that the first application has only a portrait display resource, load the portrait display resource of the first application in the current placement direction when a user interface of the first application is displayed in the first application window of the display screen; or if the value relationship between the window width and the window height is that the window width is less than the window height, and the display resource status of the first application is that the first application has only a landscape display resource, load the landscape display resource of the first application in the current placement direction when a user interface of the first application is displayed in the first application window of the display screen.

In this way, the mobile terminal may allocate a corresponding landscape display resource or portrait display resource to the first application window based on the value relationship between the window width and the window height of the first application window in the current placement direction, so that a display resource can match a window according to an actual size of the window and the current placement direction of the mobile terminal, and an application has a better display effect.

In a possible design, that the processor determines a display resource status of the first application specifically includes: obtaining, by the processor, a display attribute of the first application from the memory, where the display attribute is used to indicate that a display direction of the first application is not limited or is limited; and if the display attribute of the first application indicates that the display direction of the first application is not limited, determining, by the processor, that the first application has a landscape display resource and a portrait display resource; or if the display attribute of the first application indicates that the display direction of the first application is limited, determining that the first application has only a display resource in a limited display direction, where the display resource in the limited display direction is a landscape display resource or a portrait display resource.

In a possible design, the processor is further configured to: when the mobile terminal determines that the first application window and the second application window are to be simultaneously displayed on the display screen, and the display attribute of the first application indicates that the display direction of the first application is limited, modify the display attribute of the first application to an attribute indicating that the display direction is not limited, and record the display attribute of the first application prior to the modification.

In a possible design, that the processor determines that the first application has a landscape display resource and a portrait display resource specifically includes: if the display attribute of the first application indicates that the display direction of the first application is not limited and is not modified, determining that the first application has a landscape display resource and a portrait display resource; or if the display attribute of the first application is modified, and the display attribute prior to the modification indicates that the display direction of the first application is limited, determining that the first application has only a display resource in the limited display direction.

In a possible design, that the processor obtains a display attribute of the first application from the memory specifically includes: reading, by the processor, a value of a first flag bit in a configuration file that is of the first application and is in the memory, to obtain a display attribute of the first application window, where the first flag bit is used to indicate the display attribute of the first application window.

In a possible design, the configuration file further includes a second flag bit, and the processor is specifically configured to: modify the value of the first flag bit in the memory, so that a modified value of the first flag bit represents that the display attribute of the first application indicates that the display direction is not limited, and store, in the second flag bit, the value of the first flag bit prior to the modification.

In a possible design, if the user interface of the first application and a user interface of the second application fully occupy an area used to display an application interface on the display screen, and the user interface of the first application and the user interface of the second application do not overlap, the processor is further configured to: obtain a display attribute of the first application from the memory, where the display attribute of the first application is used to indicate that a display direction of the first application is not limited or is limited, and obtain a display attribute of the second application, where the display attribute of the second application is used to indicate that a display direction of the second application is not limited or is limited; and adjust a size of the first application window on the display screen and a size of the second application window on the display screen if the display attribute of the first application indicates that the display direction of the first application is limited, a limited display direction of the first application is a portrait direction, the display attribute of the second application indicates that the display direction of the second application is limited, and a limited display direction of the second application is a landscape direction, so that the window width of the first application window in the placement direction of the mobile terminal is less than the window height, and a window width of the second application window in the placement direction of the mobile terminal is greater than a window height.

In a possible design, the processor is further configured to: adjust the first application window on the display screen if the display attribute of the first application indicates that the display direction of the first application is limited, a limited display direction of the first application is a portrait direction, and the display attribute of the second application indicates that the display direction of the second application is not limited, so that the window width of the first application window in the placement direction of the mobile terminal is less than the window height; or adjust the first application window on the display screen if the display attribute of the first application indicates that the display direction of the first application is limited, a limited display direction of the first application is a landscape direction, and the display attribute of the second application indicates that the display direction of the second application is not limited, so that the window width of the first application window in the placement direction of the mobile terminal is greater than the window height.

According to a third aspect, an embodiment of the present invention provides a mobile terminal. A display screen of the mobile terminal includes at least a first application window and a second application window. The mobile terminal includes: an obtaining unit, configured to obtain a current placement direction of the mobile terminal; a determining unit, configured to: determine a window width and a window height of the first application window in the current placement direction, determine a value relationship between the window width and the window height, and determine a display resource status of the first application; and a display unit, configured to: if the value relationship between the window width and the window height is that the window width is greater than the window height, and the display resource status of the first application is that the first application has a landscape display resource, load the landscape display resource of the first application in the current placement direction when a user interface of the first application is displayed in the first application window; or if the value relationship between the window width and the window height is that the window width is less than the window height, and the display resource status of the first application is that the first application has a landscape display resource and a portrait display resource, load the portrait display resource of the first application in the current placement direction when a user interface of the first application is displayed in the first application window.

In this way, the mobile terminal may allocate a corresponding landscape display resource or portrait display resource to the first application window based on the value relationship between the window width and the window height of the first application window in the current placement direction, so that a display resource can match a window according to an actual size of the window and the current placement direction of the mobile terminal, and an application has a better display effect.

In a possible design, the display unit is further configured to: if the value relationship between the window width and the window height is that the window width is greater than the window height, and the display resource status of the first application is that the first application has only a portrait display resource, load the portrait display resource of the first application in the current placement direction when a user interface of the first application is displayed in the first application window; or if the value relationship between the window width and the window height is that the window width is less than the window height, and the display resource status of the first application is that the first application has only a landscape display resource, load the landscape display resource of the first application in the current placement direction when a user interface of the first application is displayed in the first application window.

In a possible design, the obtaining unit is further configured to obtain a display attribute of the first application, where the display attribute is used to indicate that a display direction of the first application is not limited or is limited; and the determining unit is further configured to: if the display attribute of the first application indicates that the display direction of the first application is not limited, determine that the first application has a landscape display resource and a portrait display resource; or if the display attribute of the first application indicates that the display direction of the first application is limited, determine that the first application has only a display resource in a limited display direction, where the display resource in the limited display direction is a landscape display resource or a portrait display resource.

In a possible design, the mobile terminal further includes a modification unit, configured to: when the mobile terminal determines that the first application window and the second application window are to be simultaneously displayed on the display screen, and the display attribute of the first application indicates that the display direction of the first application is limited, modify the display attribute of the first application to an attribute indicating that the display direction is not limited, and record the display attribute of the first application prior to the modification.

In a possible design, the determining unit is specifically configured to: if the display attribute of the first application indicates that the display direction of the first application is not limited and is not modified, determine that the first application has a landscape display resource and a portrait display resource; or if the display attribute of the first application is modified, and the display attribute prior to the modification indicates that the display direction of the first application is limited, determine that the first application has only a display resource in the limited display direction.

In a possible design, the obtaining unit is specifically configured to read a value of a first flag bit in a configuration file of the first application, to obtain a display attribute of the first application window, where the first flag bit is used to indicate the display attribute of the first application window.

In a possible design, the configuration file further includes a second flag bit, and the modification unit is specifically configured to: modify the value of the first flag bit, so that a modified value of the first flag bit represents that the display attribute of the first application indicates that the display direction is not limited, and store, in the second flag bit, the value of the first flag bit prior to the modification.

In a possible design, if the user interface of the first application and a user interface of the second application fully occupy an area used to display an application interface on the display screen, and the user interface of the first application and the user interface of the second application do not overlap, the mobile terminal further includes an adjustment unit, configured to: adjust a size of the first application window and a size of the second application window if a display attribute of the first application indicates that a display direction of the first application is limited, a limited display direction of the first application is a portrait direction, a display attribute of the second application indicates that a display direction of the second application is limited, and a limited display direction of the second application is a landscape direction, so that the window width of the first application window in the placement direction of the mobile terminal is less than the window height, and a window width of the second application window in the placement direction of the mobile terminal is greater than a window height.

In a possible design, the adjustment unit is further configured to: adjust a size of the first application window if a display attribute of the first application indicates that a display direction of the first application is limited, a limited display direction of the first application is a portrait direction, and a display attribute of the second application indicates that a display direction of the second application is not limited, so that the window width of the first application window in the placement direction of the mobile terminal is less than the window height; or adjust a size of the first application window if a display attribute of the first application indicates that a display direction of the first application is limited, a limited display direction of the first application is a landscape direction, and a display attribute of the second application indicates that a display direction of the second application is not limited, so that the window width of the first application window in the placement direction of the mobile terminal is greater than the window height.

These aspects or other aspects of the present invention are described more briefly and clearly in the following embodiments.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following clearly and completely describes the technical solutions in the embodiments of the present invention with reference to the accompanying drawings in the embodiments of the present invention. Apparently, the described embodiments are only some but not all of the embodiments of the present invention.

In addition, the terms "first" and "second" are only intended for a purpose of description, and shall not be understood as an indication or implication of relative importance or implicit indication of the quantity of indicated technical features. Therefore, a feature limited by "first" or "second" may explicitly or implicitly include one or more features. In the descriptions in the present invention, "multiple" means at least two, unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
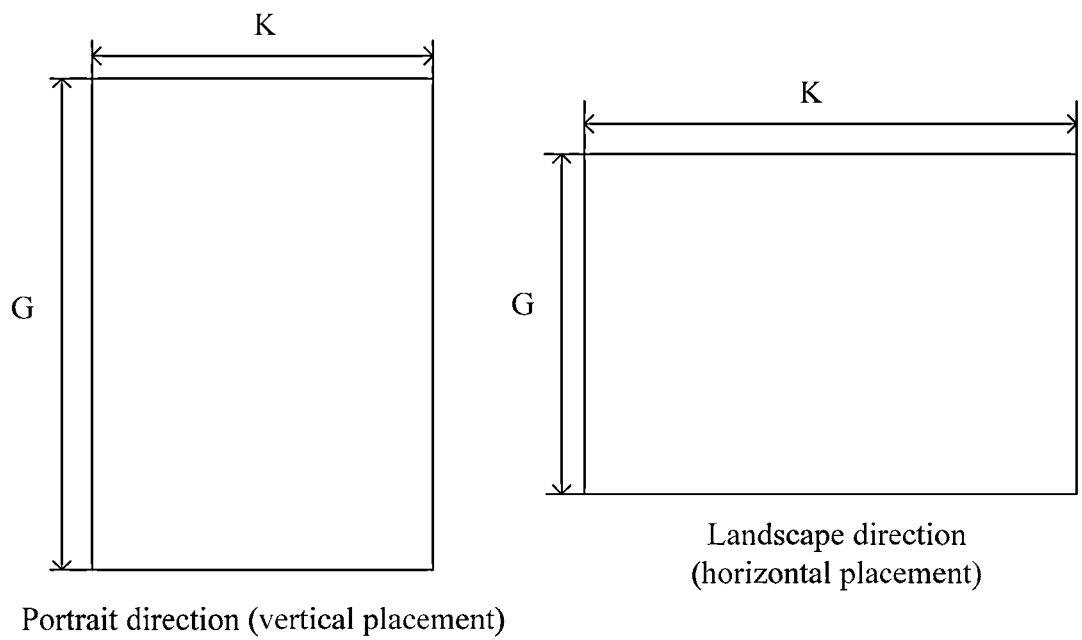
FIG. 1 is a schematic diagram of a landscape direction and a portrait direction of a terminal in the prior art.
Figure 2:
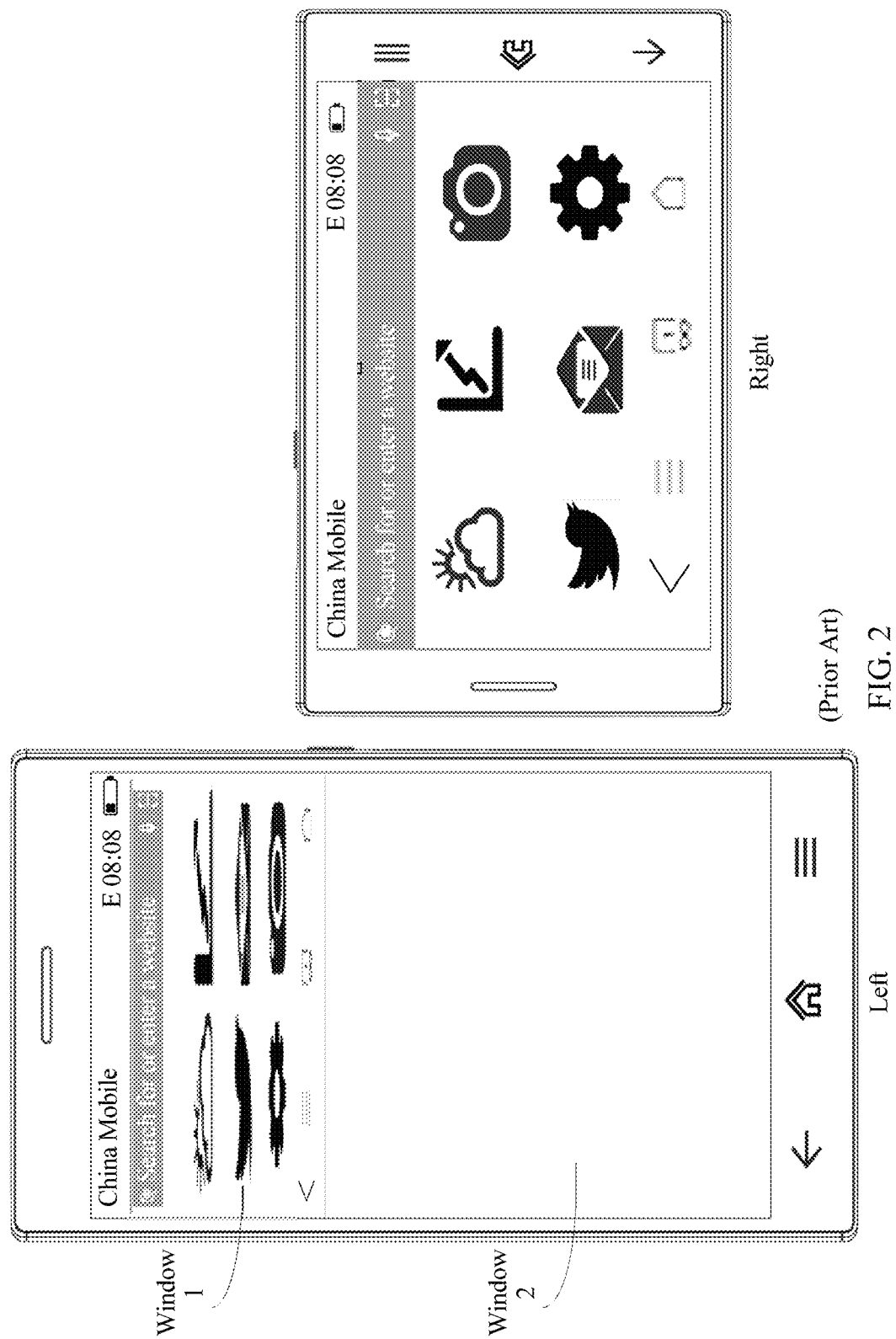
FIG. 2 is a first schematic diagram of a scenario of displaying multiple application windows.
Figure 3:
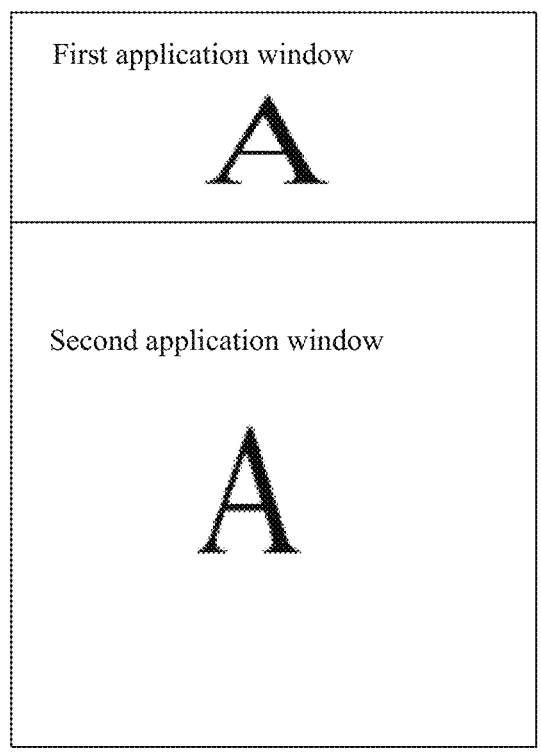
FIG. 3 is a second schematic diagram of a scenario of displaying multiple application windows.

A method for displaying multiple application windows by a mobile terminal provided in the embodiments of the present invention may be specifically applied to a scenario of displaying multiple application windows. FIG. 3 is used as an example. The multiple application windows include at least a first application window and a second application window that may be used to respectively display, on one display screen, a user interface of a first application and a user interface of a second application.

Specifically, the first application window for displaying the first application is used as an example. In the method for displaying multiple application windows by a mobile terminal provided in the embodiments of the present invention, it is determined, based on a display resource status of the first application and according to a current placement direction of the mobile terminal and a window width and a window height of the first application window in the current placement direction, to load a portrait display resource or a landscape display resource for a user, so as to meet a view requirement of the user.

To describe in detail the method for displaying multiple application windows by a mobile terminal, several concepts used in the embodiments of the present invention are explained first.

A portrait display resource is a display resource that matches an application interface display window whose window width is less than a window height in a placement direction of a terminal, and may specifically include a portrait layout resource, a portrait position resource, a portrait picture resource, and the like. For example, the portrait layout resource is specifically used to indicate icons that are laid out in the first application window, the portrait position resource is used to indicate position information of each icon in the first application window, and the portrait picture resource is used to indicate information such as a shape and a color of each icon in the first application window.

Similar to the portrait display resource, a landscape display resource is a display resource that matches an application interface display window whose window width is greater than a window height in the placement direction of the terminal, and may specifically include a landscape layout resource, a landscape position resource, a landscape picture resource, and the like.

A portrait display resource and/or a landscape display resource of each application may be stored in a resource file (for example, an APK file) corresponding to each application.

Figure 4:
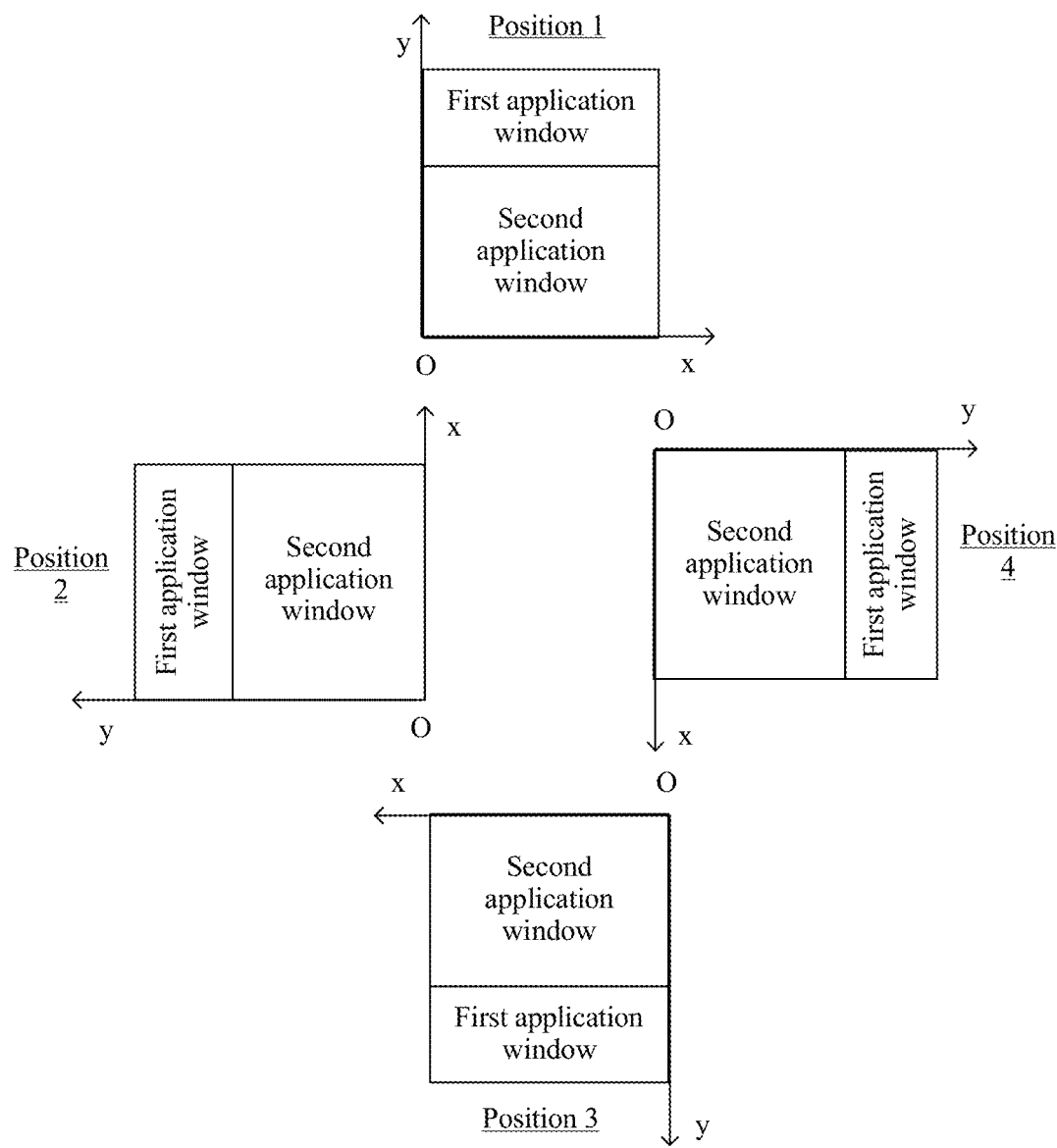
FIG. 4 is a schematic diagram of a relationship between a current placement direction of a mobile terminal and both a window width and a window height according to an embodiment of the present invention.

Further, a window width and a window height in the embodiments of the present invention indicate a window width and a window height in the current placement direction of the mobile terminal. As shown in FIG. 4, a point O on a screen of the mobile terminal is used as an origin, to establish a rectangular coordinate system. When the mobile terminal is in a position 1 and a position 3, the window width of the first application window is a length or a projection of the first application window in an x-axis direction of the rectangular coordinate system, and the window height of the first application window is a length or a projection of the first application window in a y-axis direction of the rectangular coordinate system. When the mobile terminal is in a position 2 and a position 4, the window width of the first application window is a length or a projection of the first application window in the y-axis direction of the rectangular coordinate system, and the window height of the first application window is a length or a projection of the first application window in the x-axis direction of the rectangular coordinate system.

In addition, each application on the mobile terminal has a display attribute, and the display attribute is used to indicate whether a display direction of the application is limited.

Figure 5:
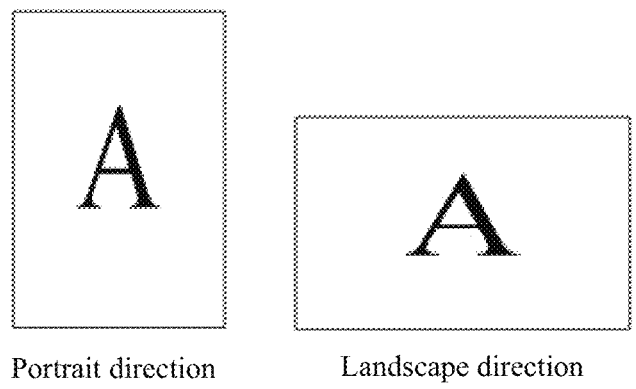
FIG. 5 is a schematic diagram in which a display attribute of an application indicates that a display direction of the application is not limited according to an embodiment of the present invention.

Specifically, if a display attribute of an application indicates that a display direction of the application is not limited, and as shown in FIG. 5, that there is only one application window on the mobile terminal is used as an example, when the mobile terminal is in a portrait direction, the mobile terminal loads a portrait display resource in the current placement direction for the application; or when the mobile terminal is in a landscape direction, the mobile terminal loads a landscape display resource in the current placement direction for the application.

Figure 6:
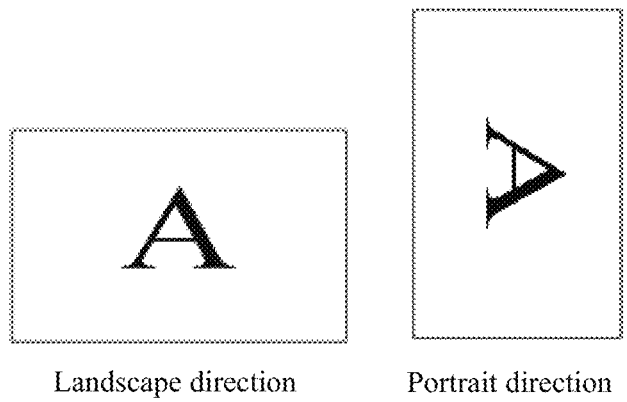
FIG. 6 is a schematic diagram in which a display attribute of an application indicates that a display direction of the application is limited according to an embodiment of the present invention.

If a display attribute of an application indicates that a display direction of the application is limited, the mobile terminal loads a corresponding display resource only in a limited display direction of the application. For example, as shown in FIG. 6, that there is only one application window on the mobile terminal is still used as an example. If the display attribute of the application indicates that the limited display direction of the application is a landscape direction, even if the current placement direction of the mobile terminal is a portrait direction, the mobile terminal loads a display resource of the application in the limited display direction (that is, the landscape direction) of the application instead of loading the display resource in the portrait direction.

Figure 7:
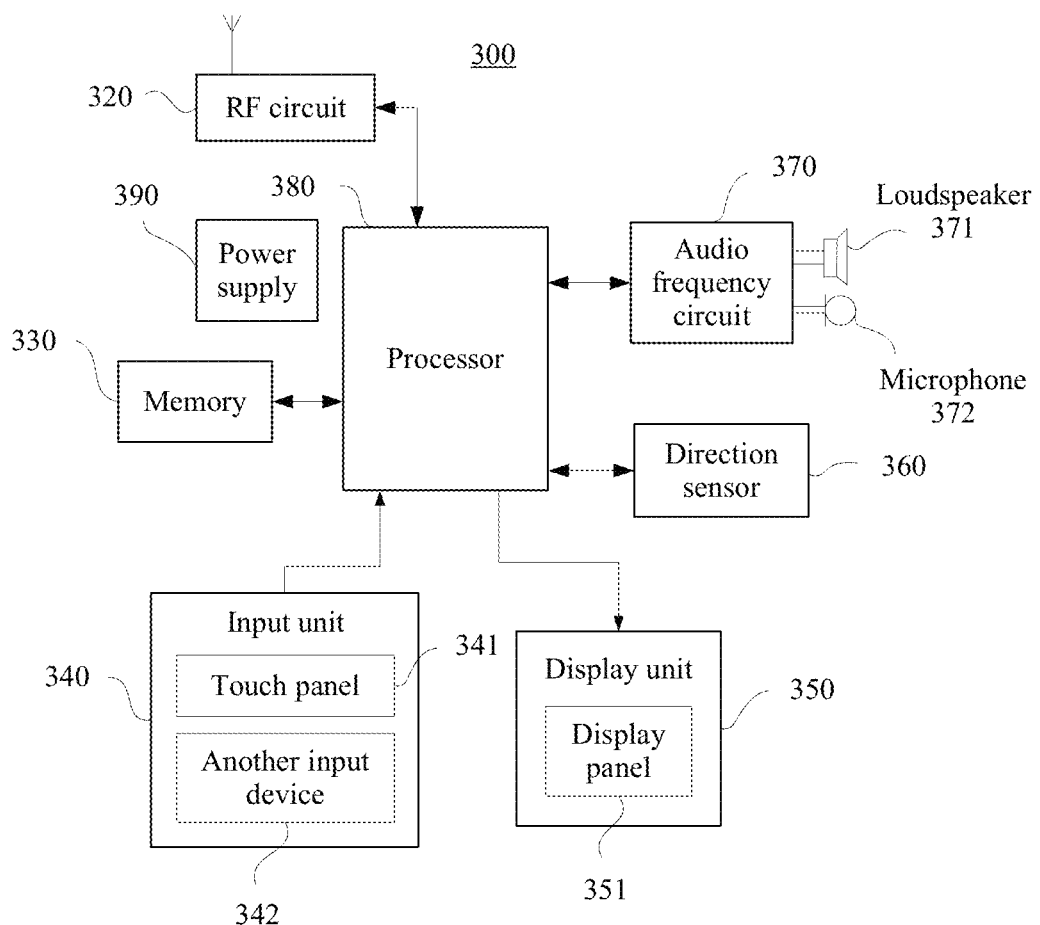
FIG. 7 is a schematic structural diagram of hardware of a mobile terminal according to an embodiment of the present invention.

Further, FIG. 7 is a schematic structural diagram of a mobile terminal according to an embodiment of the present invention. The mobile terminal may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant). In this embodiment of the present invention, an example that the mobile terminal is a mobile phone is used for description. FIG. 7 shows a block diagram of a partial structure of a mobile phone 300 related to the embodiments of the present invention.

As shown in FIG. 7, the mobile phone 300 includes components such as an RF (radio frequency, radio frequency) circuit 320, a memory 330, an input unit 340, a display unit 350, a direction sensor 360, an audio frequency circuit 370, a processor 380, and a power supply 390. A person skilled in the art may understand that the structure of the mobile phone shown in FIG. 7 constitutes no limitation on the mobile phone, and the mobile phone may include more or fewer components than those shown in the figure, or some components may be combined, or a different component deployment may be used.

With reference to FIG. 7, the following describes each component of the mobile phone 300 in detail.

The RF circuit 320 may be configured to receive and send signals during an information receiving and sending process or a call process. Particularly, after receiving downlink information from a base station, the RF circuit 320 sends the downlink information to the processor 380 for processing, and in addition, sends uplink data to the base station. Generally, the RF circuit includes but is not limited to an antenna, at least one amplifier, a transceiver, a coupler, an LNA (low noise amplifier, low noise amplifier), and a duplexer. In addition, the RF circuit 320 may further communicate with a network and another device by means of wireless communication. Any communications standard or protocol may be used for the wireless communication, including but not limited to GSM (global system of mobile communication, Global System for Mobile Communications), GPRS (general packet radio service, general packet radio service), CDMA (code division multiple access, Code Division Multiple Access), WCDMA (wideband code division multiple access, Wideband Code Division Multiple Access), LTE (long term evolution, Long Term Evolution), email, and SMS (short messaging service, short messaging service).

The memory 330 may be configured to store a software program and a module. By running the software program and the module that are stored in the memory 330, the processor 380 executes various function applications of the mobile phone 300 and performs data processing. The memory 330 may mainly include a program storage area and a data storage area. The program storage area may store an operating system, and an application program required for at least one function (such as a sound play function or an image play function), and the like. The data storage area may store data (such as audio data, video data, or a phonebook) created according to use of the mobile phone 300, and the like. In addition, the memory 330 may include a high-speed random access memory, and may further include a nonvolatile memory, for example, at least one magnetic disk storage component, a flash memory component, or another volatile solid-state storage component.

The input unit 340 may be configured to receive entered digital or character information, and generate key signal input related to a user setting and function control of the mobile phone 300. Specifically, the input unit 340 may include a touchscreen 341 and another input device 342. The touchscreen 341 is also referred to as a touch panel, and may collect a touch operation (such as an operation performed by a user on the touchscreen 341 or near the touchscreen 341 by using any proper object or accessory such as a finger or a stylus) performed by the user on or near the touchscreen, and drive a corresponding connection apparatus according to a preset program. Optionally, the touchscreen 341 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, sends the coordinates of the touch point to the processor 380, and can receive and execute a command sent by the processor 380. In addition, the touchscreen 341 may be implemented by using multiple types such as a resistive type, a capacitive type, an infrared ray, and a surface acoustic wave. In addition to the touchscreen 341, the input unit 340 may further include another input device 342. Specifically, the another input device 342 may include but is not limited to one or more of a physical keyboard, a function key (such as a volume control key or an on/off key), a trackball, a mouse, or a joystick, or the like.

The display unit 350 may be configured to display information entered by the user or information provided for the user, and various menus of the mobile phone 300. The display unit 350 may include a display panel 351. Optionally, the display panel 351 may be configured in a form of an LCD (Liquid Crystal Display, liquid crystal display), an OLED (Organic Light-Emitting Diode, organic light-emitting diode), or the like. Further, the touchscreen 341 may cover the display panel 351. After detecting a touch operation on or near the touchscreen 341, the touchscreen 341 transfers the touch operation to the processor 380 to determine a type of a touch event, and then the processor 380 provides corresponding visual output on the display panel 351 according to the type of the touch event. In FIG. 7, although the touchscreen 341 and the display panel 351 are used as two independent components to implement input and input functions of the mobile phone 300, in some embodiments, the touchscreen 341 and the display panel 351 may be integrated to implement the input and output functions of the mobile phone 300.

The direction sensor 360 such as an acceleration sensor or a gravity sensor (gravity sensor) may detect a value of an acceleration in each direction (generally, three axes) of the mobile phone, may detect a value and a direction of gravity when the direction sensor is static, and may be used in an application for identifying an acceleration of the mobile phone in each direction (such as screen switching between a landscape mode and a portrait mode, a related game, and magnetometer posture calibration), a function related to vibration identification (such as a pedometer and a knock), and the like.

The mobile phone 300 may further include another sensor, such as a light sensor. Specifically, the light sensor may include an ambient light sensor and a proximity light sensor. The ambient light sensor may adjust luminance of the display panel 351 according to brightness or dimness of ambient light. The proximity light sensor may detect whether an object is close to or comes into contact with the mobile phone, and may turn off the display panel 351 and/or backlight when the mobile phone 300 moves to an ear of the user. Other sensors such as a gyroscope, a barometer, a hygrometer, a thermometer, and an infrared sensor may be further configured in the mobile phone 300. Details are not described herein.

The audio frequency circuit 370, a loudspeaker 371, and a microphone 372 may provide an audio interface between the user and the mobile phone 300. The audio frequency circuit 370 may convert received audio data into an electrical signal, and transmit the electrical signal to the loudspeaker 371, and the loudspeaker 371 converts the electrical signal into a sound signal for output. In another aspect, the microphone 372 converts a collected sound signal into an electrical signal, and the audio frequency circuit 370 converts the electrical signal into audio data after receiving the electrical signal, and then outputs the audio data to the RF circuit 320, so as to send the audio data to, for example, another mobile phone, or output the audio data to the memory 330 for further processing.

The processor 380 is a control center of the mobile phone 300, connects to various parts of the entire mobile phone by using various interfaces and lines, and executes various functions of the mobile phone 300 and performs data processing by running or executing the software program and/or the module that are/is stored in the memory 330 and by invoking data stored in the memory 330, so as to perform overall monitoring on the mobile phone. Optionally, the processor 380 may include one or more processing units. Preferably, the processor 380 may integrate an application processor and a modem processor. The application processor mainly processes an operating system, a user interface, an application program, and the like. The modem processor mainly processes radio communication. It may be understood that the foregoing modem processor may be not integrated into the processor 380.

The mobile phone 300 further includes the power supply 390 (such as a battery) that supplies power to each component. Preferably, the power supply may be logically connected to the processor 380 by using a power supply management system, so as to implement functions such as charging management, discharging management, and power consumption management by using the power supply management system.

Although not shown, the mobile phone 300 may further include a WiFi (wireless fidelity, Wireless Fidelity) module, a Bluetooth module, and the like. Details are not described herein.

In this embodiment of the present invention, the memory 330 stores a configuration file of a first application. Window size information of a first application window and a display attribute of the first application are recorded in the configuration file.

In this way, in a method for displaying multiple application windows by a mobile terminal provided in this embodiment of the present invention, the direction sensor 360 (for example, an acceleration sensor or a gravity sensor) may identify an acceleration of the mobile terminal in each direction to determine a current placement direction of the mobile terminal, and send the current placement direction of the mobile terminal to the processor 380 by using a communications interface. Certainly, the direction sensor 360 may send a detected acceleration signal to the processor 380 by using a communications interface, and the processor 380 determines a current placement direction of the mobile terminal according to the acceleration signal.

The processor 380 determines, by reading the configuration file in the memory 330, a window width and a window height of the first application window in the current placement direction, and further determines a value relationship between the window width and the window height. In addition, the processor 380 may further determine a display resource status of the first application by reading the configuration file in the memory 330, to determine to load a portrait display resource or a landscape display resource for a user, so as to meet a view requirement of the user.

Figure 8A:
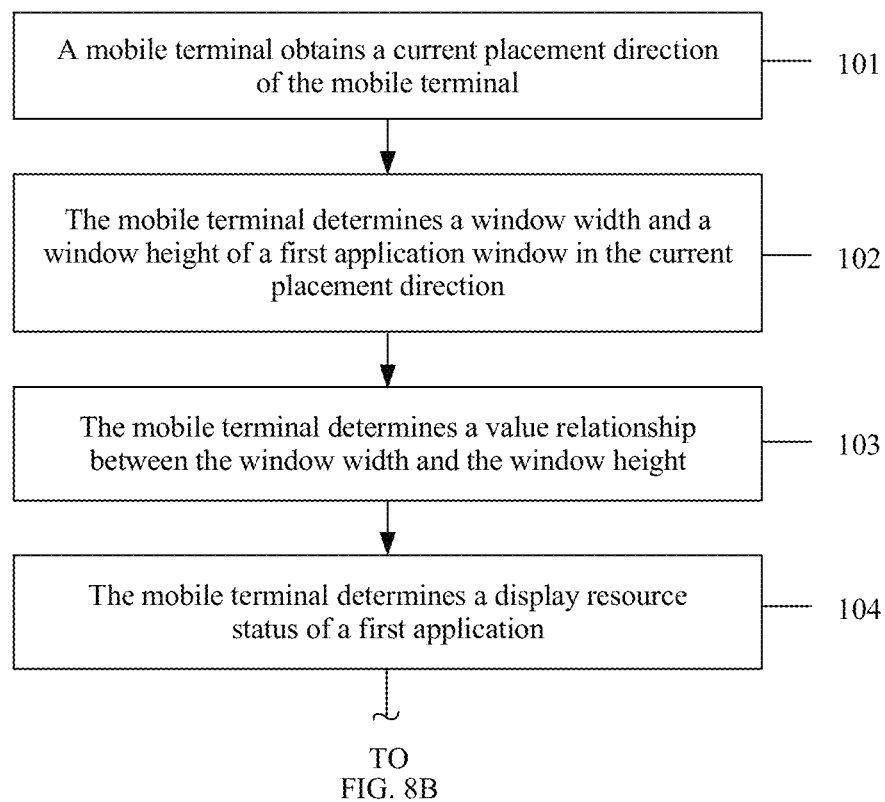
FIG. 8A and FIG. 8B are a first schematic diagram of a method for displaying multiple application windows by a mobile terminal according to an embodiment of the present invention.
Figure 8B:
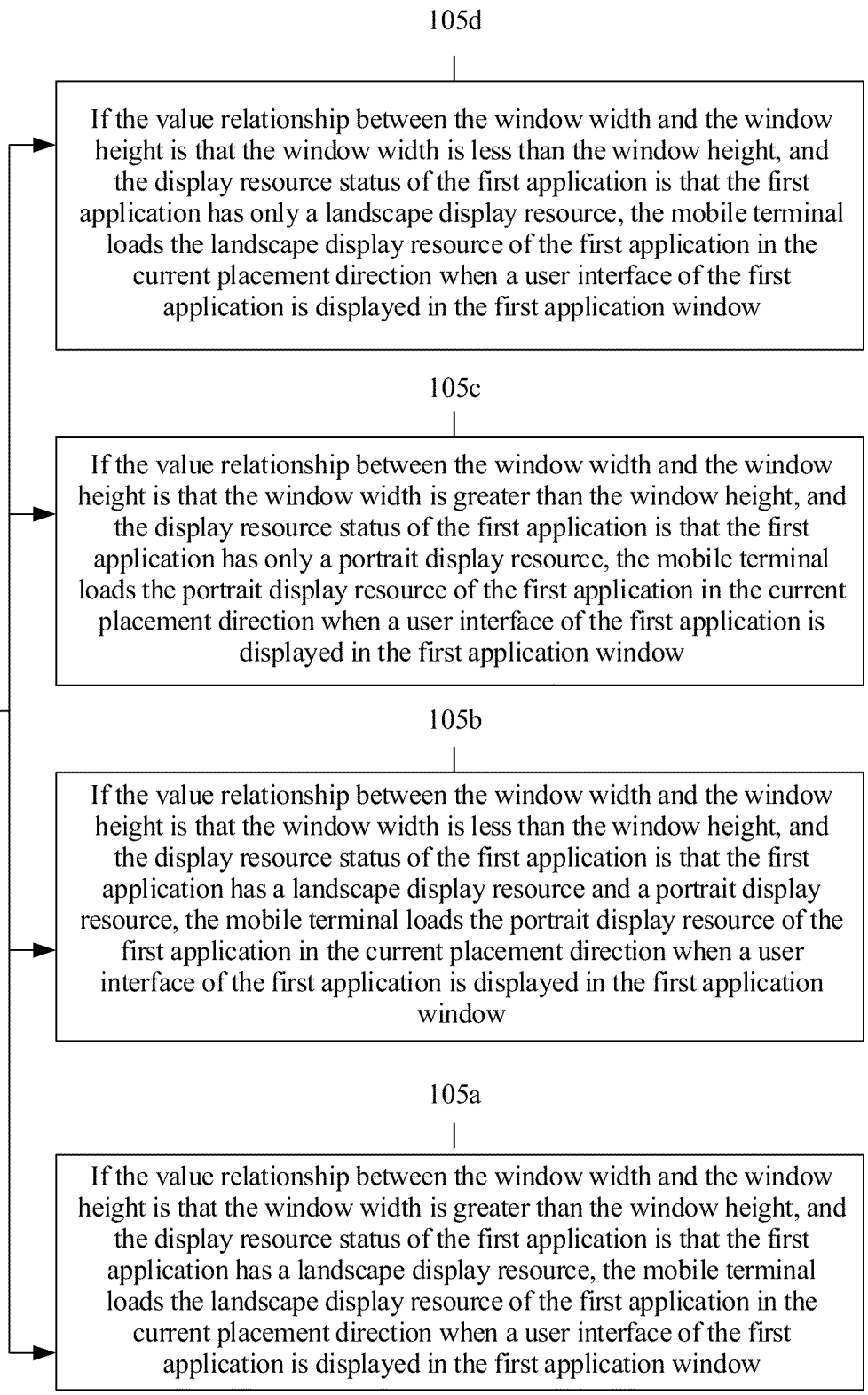

With reference to FIG. 7, the following describes in detail a method for displaying multiple application windows by a mobile terminal according to an embodiment of the present invention. As shown in FIG. 8A and FIG. 8B, the method includes the following steps.

101. A mobile terminal obtains a current placement direction of the mobile terminal.

Specifically, a direction sensor 360 may identify a posture of the mobile terminal, to determine the current placement direction of the mobile terminal. For example, the current placement direction includes four directions shown in FIG. 4. Further, the direction sensor 360 sends the current placement direction of the mobile terminal to a processor 380 by using a communications interface, so that the mobile terminal obtains the current placement direction of the mobile terminal. As described above, a processor 380 may determine the current placement direction of the mobile terminal by using a measurement signal from a direction sensor 360.

102. The mobile terminal determines a window width and a window height of a first application window in the current placement direction.

Concepts of the window width and the window height are described in detail in the foregoing embodiment, and therefore, details are not described herein again.

Specifically, after the current placement direction of the mobile terminal is obtained, the processor 380 may read a configuration file of a first application from a memory. Window position information and window size information of the first application window are stored in the configuration file. For example, a window size of the first application window is 600*800. In this case, the processor 380 may determine the window width and the window height of the first application window in the current placement direction according to the current placement direction obtained in step 101. For example, as shown in FIG. 4, when the current placement direction of the mobile terminal is a position 1, a length 800 of the first application window in an x-axis direction of a rectangular coordinate system is the window width, and a length 600 of the first application window in a y-axis direction of the rectangular coordinate system is the window height.

103. The mobile terminal determines a value relationship between the window width and the window height.

Specifically, the processor 380 determines the value relationship between the window width and the window height that are determined in step 102. For example, the window width is greater than the window height, or the window width is less than the window height.

104. The mobile terminal determines a display resource status of a first application.

In step 104, the mobile terminal first obtains a display attribute of the first application, that is, learns that a display direction of the first application is not limited or is limited. Further, if the display attribute of the first application indicates that the display direction of the first application is not limited, the mobile terminal further determines that the first application has a landscape display resource and a portrait display resource. On the contrary, if the display attribute of the first application indicates that the display direction of the first application is limited, the mobile terminal further determines that the first application has only a display resource in a limited display direction. The display resource in the limited display direction is a landscape display resource or a portrait display resource.

Specifically, the processor 380 may read a value of a first flag bit in the configuration file of the first application in the memory 330, so as to obtain a display attribute of the first application window.

For example, when the first flag bit is −1, it indicates that the display direction of the first direction is not limited. When the first flag bit is 0, it indicates that the display direction of the first application is limited, and the limited display direction is a landscape direction. When the first flag bit is 1, it indicates that the display direction of the first application is limited, and the limited display direction is a portrait direction.

In addition, when the mobile terminal determines that the first application window and a second application window are to be simultaneously displayed on a display screen, if the display attribute of the first application indicates that the display direction of the first application is limited, the processor 380 may modify the display attribute of the first application to an attribute indicating that the display direction is not limited, and record the display attribute of the first application prior to the modification.

For example, the configuration file in the memory 330 further includes a second flag bit. If the display attribute of the first application indicates that the display direction of the first application is limited, the processor 380 modifies the value of the first flag bit, so that a modified value of the first flag bit represents that the display attribute of the first application indicates that the display direction is not limited, and stores, in the second flag bit, the value of the first flag bit prior to the modification.

For example, if the first flag bit is 1, that is, the display direction of the first application is limited, and the limited display direction is the portrait direction, the processor 380 may modify the first flag bit from 1 to −1, and record, in the second flag bit, the value of the first flag bit prior to the modification, that is, 1.

In this case, if the display attribute of the first application indicates that the display direction of the first application is not limited and is not modified, the processor 380 may determine that the first application has a landscape display resource and a portrait display resource. Correspondingly, if the display attribute of the first application is modified, and the display attribute prior to the modification indicates that the display direction of the first application is limited, the processor 380 determines that the first application has only a display resource in the limited display direction.

It should be noted herein that if the value of the first flag bit is consistent with a value of the second flag bit, and both indicate that the display direction is not limited, it indicates that the display attribute of the first application is not modified. If the value of the first flag bit is inconsistent with a value of the second flag bit, it indicates that the display attribute of the first application is modified.

In this way, the display direction of the first application window after the modification is a display direction that is not limited. Therefore, when the current placement direction of the mobile terminal changes, the mobile terminal may rotate the first application window, and preferentially obtain, according to the value that is of the first flag bit prior to the modification and is recorded in the second flag bit, the display resource that is in the limited display direction and is corresponding to the value of the first flag bit prior to the modification.

It should be noted that a sequence of performing step 104 and steps 101 to 103 is not limited. For example, when the mobile terminal enables the first application, the mobile terminal may be triggered to obtain the display attribute of the first application. Alternatively, when a size of the displayed first application window is modified, for example, when a user manually modifies the size of the first application window, the mobile terminal may be triggered to obtain the display attribute of the first application. Alternatively, when a gravity sensor in the mobile terminal determines that the current placement direction of the mobile terminal changes, the mobile terminal may be triggered to obtain the display attribute of the first application.

In this way, after performing steps 101 to 104, the mobile terminal may obtain the value relationship between the window width and the window height of the first application window in the current placement direction, and the display resource status of the first application. Therefore, as shown in the following steps 105a to 105d, the mobile terminal may allocate a corresponding landscape display resource or portrait display resource to the first application window based on the value relationship between the window width and the window height of the first application window in the current placement direction.

105a. If the value relationship between the window width and the window height is that the window width is greater than the window height, and the display resource status of the first application is that the first application has a landscape display resource, the mobile terminal loads the landscape display resource of the first application in the current placement direction when a user interface of the first application is displayed in the first application window.

105b. If the value relationship between the window width and the window height is that the window width is less than the window height, and the display resource status of the first application is that the first application has a landscape display resource and a portrait display resource, the mobile terminal loads the portrait display resource of the first application in the current placement direction when a user interface of the first application is displayed in the first application window.

In this way, in a scenario of displaying multiple application windows, the mobile terminal may allocate a corresponding landscape display resource or portrait display resource to the first application window according to the value relationship between the window width and the window height of the first application window in the current placement direction and based on the display resource status of the first application, so that a display resource can match a window according to an actual size of the window and the current placement direction of the mobile terminal, so as to meet a view requirement of a user.

Optionally, after step 104, the method for displaying multiple application windows by a mobile terminal provided in this embodiment of the present invention may further include the following steps 105c and 105d.

105c. If the value relationship between the window width and the window height is that the window width is greater than the window height, and the display resource status of the first application is that the first application has only a portrait display resource, the mobile terminal loads the portrait display resource of the first application in the current placement direction when a user interface of the first application is displayed in the first application window.

105d. If the value relationship between the window width and the window height is that the window width is less than the window height, and the display resource status of the first application is that the first application has only a landscape display resource, the mobile terminal loads the landscape display resource of the first application in the current placement direction when a user interface of the first application is displayed in the first application window.

In steps 105a to 105d, a step that needs to be performed by the mobile terminal may be implemented by the processor 380 in FIG. 7 by executing a program instruction stored in the memory 330.

It should be noted that when the value relationship between the window width and the window height is that the window width is equal to the window height, regardless of whether the display direction of the first application is not limited or is limited, if the first application has not only a landscape display resource but also a portrait display resource, the mobile terminal may select either the landscape display resource or the portrait display resource as a to-be-loaded display resource, and further load the to-be-loaded display resource in the current placement direction of the mobile terminal. Certainly, if the first application has only a landscape display resource, the mobile terminal loads the landscape display resource in the current placement direction; or if the first application has only a portrait display resource, the mobile terminal loads the portrait display resource in the current placement direction.

Figure 9:
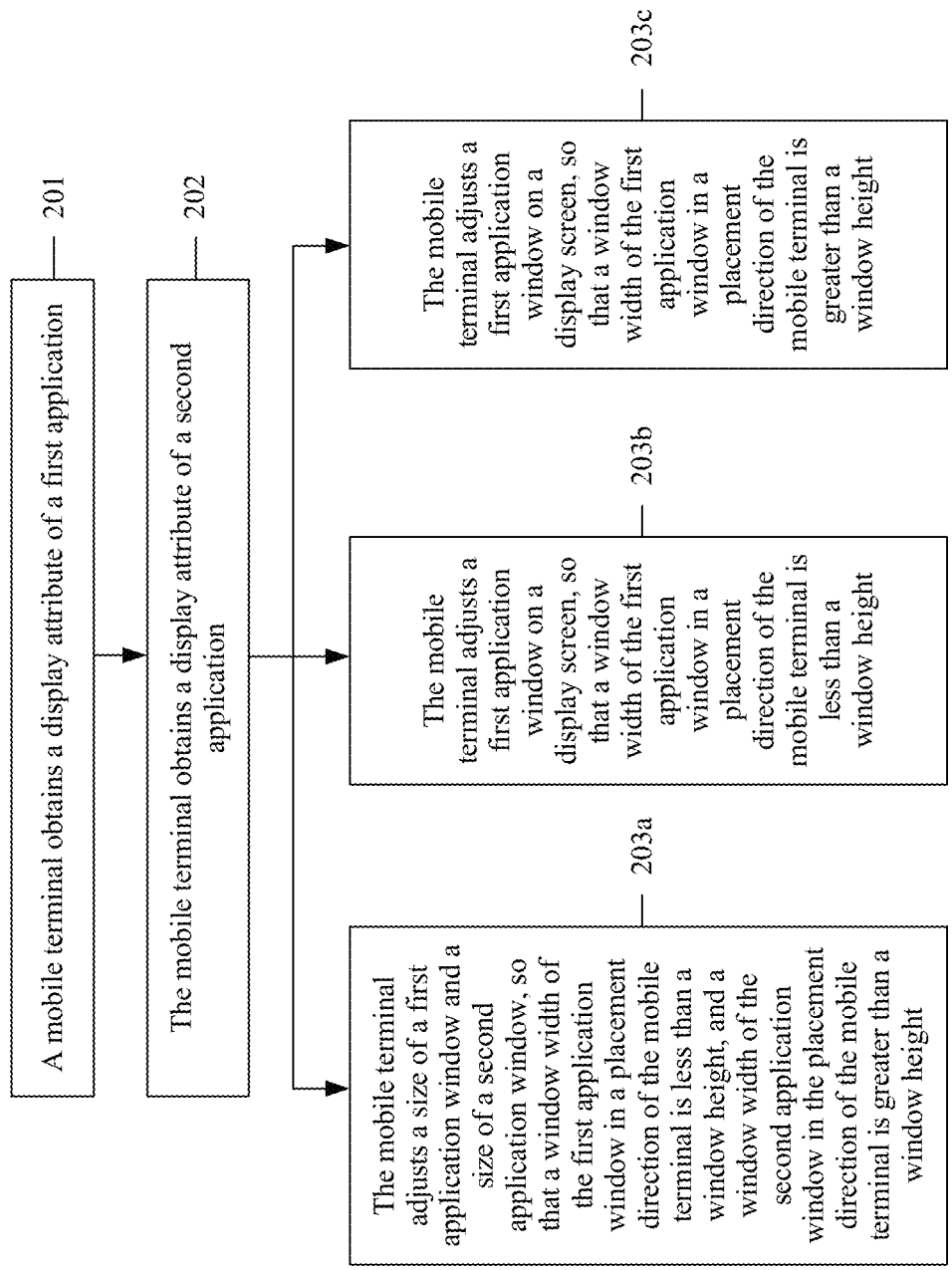
FIG. 9 is a second schematic diagram of a method for displaying multiple application windows by a mobile terminal according to an embodiment of the present invention.

In addition, when the user interface of the first application and a user interface of a second application fully occupy an area used to display an application interface on the display screen, and the user interface of the first application and the user interface of the second application do not overlap, as shown in FIG. 9, the method for displaying multiple application windows by a mobile terminal provided in this embodiment of the present invention further includes the following steps.

201. The mobile terminal obtains a display attribute of the first application, where the display attribute of the first application is used to indicate that a display direction of the first application is not limited or is limited.

202. The mobile terminal obtains a display attribute of a second application, where the display attribute of the second application is used to indicate that a display direction of the second application is not limited or is limited.

A method for obtaining the display attribute of the first application is already described in detail in the foregoing embodiment. A method for obtaining the display attribute of the second application is similar to the method for obtaining the display attribute of the first application, and therefore, details are not described herein.

It should be noted that in "the user interface of the first application and a user interface of a second application fully occupy an area used to display an application interface on the display screen", "fully occupy" is to occupy the entire area used to display an application interface on the display screen. For example, a display status bar, a virtual navigation key, or the like may be further required on the display screen, but these areas cannot be used to display an application interface.

203a. The mobile terminal adjusts a size of the first application window and a size of a second application window if the display attribute of the first application indicates that the display direction of the first application is limited, a limited display direction of the first application is a portrait direction, the display attribute of the second application indicates that the display direction of the second application is limited, and a limited display direction of the second application is a landscape direction, so that the window width of the first application window in the placement direction of the mobile terminal is less than the window height, and a window width of the second application window in the placement direction of the mobile terminal is greater than a window height.

Figure 10:
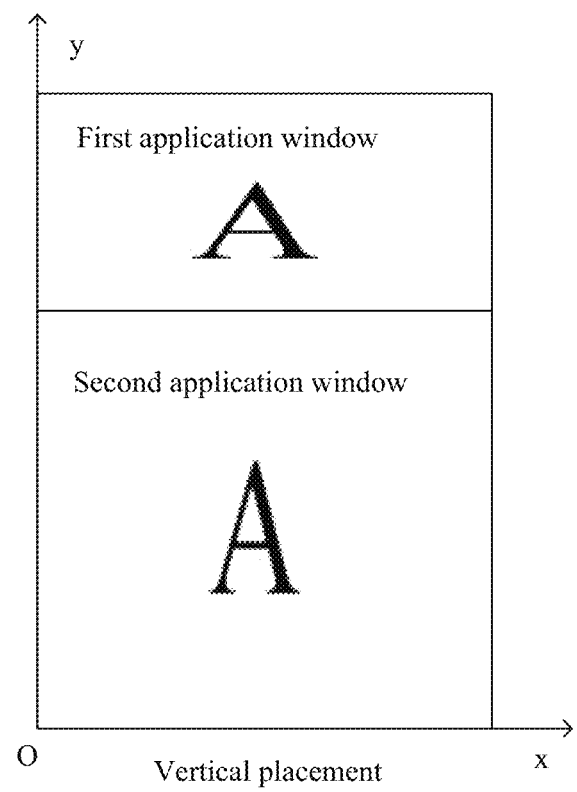
FIG. 10 is a third schematic diagram of a scenario of displaying multiple application windows.

Specifically, as shown in FIG. 10, the mobile terminal is vertically placed. In this case, if the display attribute of the first application indicates that the display direction of the first application is limited, the limited display direction of the first application is the portrait direction, the display attribute of the second application indicates that the display direction of the second application is limited, and the limited display direction of the second application is the landscape direction, to enable the user to have an optimal view effect, the processor 380 may separately adjust the size of the first application window and the size of the second application window, so that the window width of the first application window in the placement direction of the mobile terminal is less than the window height, and the window width of the second application window in the placement direction of the mobile terminal is greater than the window height.

203b. The mobile terminal adjusts the first application window on a display screen if the display attribute of the first application indicates that the display direction of the first application is limited, a limited display direction of the first application is a portrait direction, and the display attribute of the second application indicates that the display direction of the second application is not limited, so that the window width of the first application window in the placement direction of the mobile terminal is less than the window height.

Specifically, still as shown in FIG. 10, the mobile terminal is vertically placed. In this case, if the display attribute of the first application indicates that the display direction of the first application is limited, the limited display direction of the first application is the portrait direction, and the display attribute of the second application indicates that the display direction of the second application is not limited, to enable the user to have an optimal view effect, the processor 380 may adjust only a size of the first application window, so as to ensure that the window width of the first application window in the placement direction of the mobile terminal is less than the window height.

Similarly, in step 203c, the mobile terminal adjusts the first application window on the display screen if the display attribute of the first application indicates that the display direction of the first application is limited, a limited display direction of the first application is a landscape direction, and the display attribute of the second application indicates that the display direction of the second application is not limited, so that the window width of the first application window in the placement direction of the mobile terminal is greater than the window height.

In addition, it should be noted that in this embodiment of the present invention, the user interface of the first application and the user interface of the second application do not overlap on the display screen.

In this way, the embodiments of the present invention provide the method for displaying multiple application windows by a mobile terminal, and the mobile terminal. The mobile terminal obtains the current placement direction of the mobile terminal, and further determines the window width and the window height of the first application window in the current placement direction. In addition, the mobile terminal further needs to determine the display resource status of the first application. In this way, the mobile terminal may allocate a corresponding landscape display resource or portrait display resource to the first application window based on the value relationship between the window width and the window height of the first application window in the current placement direction. For example, if the value relationship between the window width and the window height is that the window width is greater than the window height, and the display resource status of the first application is that the first application has a landscape display resource, the mobile terminal loads the landscape display resource of the first application in the current placement direction when the user interface of the first application is displayed in the first application window. If the value relationship between the window width and the window height is that the window width is less than the window height, and the display resource status of the first application is that the first application has a landscape display resource and a portrait display resource, the mobile terminal loads the portrait display resource of the first application in the current placement direction when the user interface of the first application is displayed in the first application window. Therefore, it may be learned that in a scenario of displaying multiple application windows, the multiple application windows can be displayed on one display screen based on display resource statuses of the application windows, and a better display effect is provided for a user.

Figure 11:
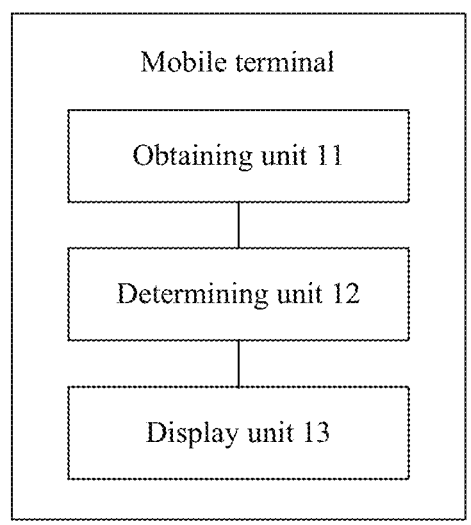
FIG. 11 is a first schematic structural diagram of a mobile terminal according to an embodiment of the present invention.

Further, FIG. 11 is a schematic structural diagram of a mobile terminal according to an embodiment of the present invention. The mobile terminal provided in this embodiment of the present invention may be used to implement the method implemented in the embodiments of the present invention shown in FIG. 3 to FIG. 10. For ease of description, only a part related to this embodiment of the present invention is shown. For specific technical details that are not disclosed, refer to the embodiments of the present invention shown in FIG. 3 to FIG. 10.

As shown in FIG. 3, a display screen of the mobile terminal includes at least a first application window and a second application window. Specifically, as shown in FIG. 11, the mobile terminal includes:
- an obtaining unit 11, configured to obtain a current placement direction of the mobile terminal;
- a determining unit 12, configured to: determine a window width and a window height of the first application window in the current placement direction, determine a value relationship between the window width and the window height, and determine a display resource status of a first application; and
- a display unit 13, configured to: if the value relationship between the window width and the window height is that the window width is greater than the window height, and the display resource status of the first application is that the first application has a landscape display resource, load the landscape display resource of the first application in the current placement direction when a user interface of the first application is displayed in the first application window; or if the value relationship between the window width and the window height is that the window width is less than the window height, and the display resource status of the first application is that the first application has a landscape display resource and a portrait display resource, load the portrait display resource of the first application in the current placement direction when a user interface of the first application is displayed in the first application window.

Further, the display unit 13 is further configured to: if the value relationship between the window width and the window height is that the window width is greater than the window height, and the display resource status of the first application is that the first application has only a portrait display resource, load the portrait display resource of the first application in the current placement direction when a user interface of the first application is displayed in the first application window; or if the value relationship between the window width and the window height is that the window width is less than the window height, and the display resource status of the first application is that the first application has only a landscape display resource, load the landscape display resource of the first application in the current placement direction when a user interface of the first application is displayed in the first application window.

Further, the obtaining unit 11 is further configured to obtain a display attribute of the first application. The display attribute is used to indicate that a display direction of the first application is not limited or is limited.

The determining unit 12 is further configured to: if the display attribute of the first application indicates that the display direction of the first application is not limited, determine that the first application has a landscape display resource and a portrait display resource; or if the display attribute of the first application indicates that the display direction of the first application is limited, determine that the first application has only a display resource in a limited display direction. The display resource in the limited display direction is a landscape display resource or a portrait display resource.

Figure 12:
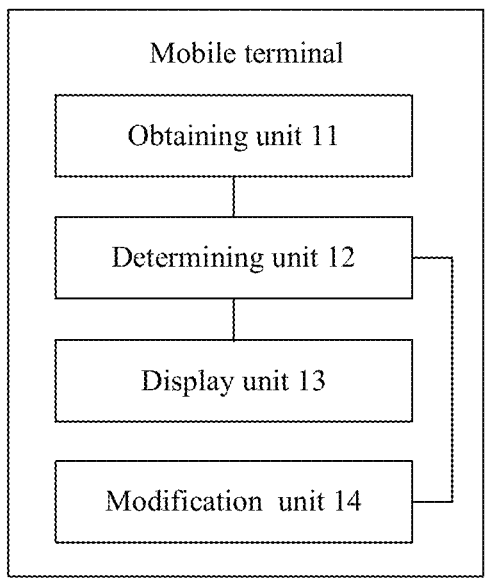
FIG. 12 is a second schematic structural diagram of a mobile terminal according to an embodiment of the present invention.

Further, as shown in FIG. 12, the mobile terminal further includes:
- a modification unit 14, configured to: when the mobile terminal determines that the first application window and the second application window are to be simultaneously displayed on the display screen, and the display attribute of the first application indicates that the display direction of the first application is limited, modify the display attribute of the first application to an attribute indicating that the display direction is not limited, and record the display attribute of the first application prior to the modification.

Further, the determining unit 12 is specifically configured to: if the display attribute of the first application indicates that the display direction of the first application is not limited and is not modified, determine that the first application has a landscape display resource and a portrait display resource; or if the display attribute of the first application is modified, and the display attribute prior to the modification indicates that the display direction of the first application is limited, determine that the first application has only a display resource in the limited display direction.

Further, the obtaining unit 11 is specifically configured to read a value of a first flag bit in a configuration file of the first application, to obtain a display attribute of the first application window. The first flag bit is used to indicate the display attribute of the first application window.

Further, the configuration file further includes a second flag bit. In this case, the modification unit 14 is specifically configured to: modify the value of the first flag bit, so that a modified value of the first flag bit represents that the display attribute of the first application indicates that the display direction is not limited, and store, in the second flag bit, the value of the first flag bit prior to the modification.

Figure 13:
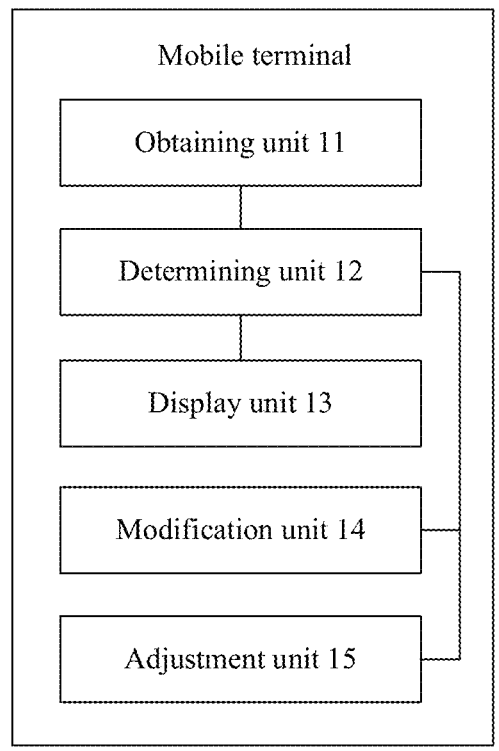
FIG. 13 is a third schematic structural diagram of a mobile terminal according to an embodiment of the present invention.

Further, if the user interface of the first application and a user interface of a second application fully occupy an area used to display an application interface on the display screen, and the user interface of the first application and the user interface of the second application do not overlap, as shown in FIG. 13, the mobile terminal further includes:
- an adjustment unit 15, configured to: adjust a size of the first application window and a size of the second application window if a display attribute of the first application indicates that a display direction of the first application is limited, a limited display direction of the first application is a portrait direction, a display attribute of the second application indicates that a display direction of the second application is limited, and a limited display direction of the second application is a landscape direction, so that the window width of the first application window in the placement direction of the mobile terminal is less than the window height, and a window width of the second application window in the placement direction of the mobile terminal is greater than a window height.

Further, the adjustment unit 15 is further configured to: adjust a size of the first application window if a display attribute of the first application indicates that a display direction of the first application is limited, a limited display direction of the first application is a portrait direction, and a display attribute of the second application indicates that a display direction of the second application is not limited, so that the window width of the first application window in the placement direction of the mobile terminal is less than the window height; or adjust a size of the first application window if a display attribute of the first application indicates that a display direction of the first application is limited, a limited display direction of the first application is a landscape direction, and a display attribute of the second application indicates that a display direction of the second application is not limited, so that the window width of the first application window in the placement direction of the mobile terminal is greater than the window height.

In addition, the obtaining unit 11 may be specifically the direction sensor 360 shown in FIG. 7, and the determining unit 12, the display unit 13, the modification unit 14, and the adjustment unit 15 may be implemented by the processor 380 in FIG. 7 by executing a program instruction stored in the memory 330.

In this way, this embodiment of the present invention provides the mobile terminal. The mobile terminal first obtains the current placement direction of the mobile terminal, and further determines the window width and the window height of the first application window in the current placement direction. In addition, the mobile terminal further needs to determine the display resource status of the first application. In this way, the mobile terminal may allocate a corresponding landscape display resource or portrait display resource to the first application window based on the value relationship between the window width and the window height of the first application window in the current placement direction. For example, if the value relationship between the window width and the window height is that the window width is greater than the window height, and the display resource status of the first application is that the first application has a landscape display resource, the mobile terminal loads the landscape display resource of the first application in the current placement direction when the user interface of the first application is displayed in the first application window. If the value relationship between the window width and the window height is that the window width is less than the window height, and the display resource status of the first application is that the first application has a landscape display resource and a portrait display resource, the mobile terminal loads the portrait display resource of the first application in the current placement direction when the user interface of the first application is displayed in the first application window. Therefore, it may be learned that in a scenario of displaying multiple application windows, the multiple application windows can be displayed on one display screen based on display resource statuses of the application windows, and a better display effect is provided for a user.

It may be clearly understood by a person skilled in the art that, for a purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for displaying multiple application windows by a mobile terminal, wherein the multiple application windows comprise at least a first application window and a second application window that respectively display, on one display screen, a user interface of a first application and a user interface of a second application, and the method comprises:

simultaneously displaying, by the mobile terminal, the first application window and the second application window on the display screen and wherein the first application window and the second application window do not overlap on the display screen, wherein the mobile terminal is placed in a portrait direction, the display screen comprises a short side and a long side, and an extension direction of the short side is perpendicular to an extension direction of the long side; and performing at least one of the following:

in response to that a window width of the first application window is greater than a window height of the first application window, displaying a landscape display resource of the first application in the first application window, and in response to that a window width of the second application window is less than a window height of the second application window, displaying a first display resource of the second application in the second application window, wherein the window width of the first application window is a projection length of the first application window in the short side of the display screen, the window height of the first application window is a projection length of the first application window in the long side of the display screen, wherein the window width of the second application window is a projection length of the second application window in the short side of the display screen, the window height of the second application window is a projection length of the second application window in the long side of the display screen, and the mobile terminal is placed in the portrait direction; or in response to that the window width of the first application window is less than the window height of the first application window, displaying a portrait display resource of the first application in the first application window, and in response to that the window width of the second application window is greater than the window height of the second application window, displaying the first display resource of the second application in the second application window, wherein a display resource of the portrait display resource is different from a display resource of the landscape display resource, and the mobile terminal is placed in the portrait direction, and wherein the second application has a first display attribute, and the first display attribute includes a first flag and a second flag, wherein a current value of the first flag indicates that a display direction of the second application is not limited and the current value of the first flag has been modified from a previous value, and wherein a current value of the second flag indicates that the display direction of the second application is limited to a portrait display direction or a landscape display direction and the second flag stores the previous value of the first flag.

2. The method according to claim 1, wherein the method further comprises:

in response to that a placement direction of the mobile terminal changes from the portrait direction to a landscape direction, rotating the first application window and the second application window;

in response to that the window width of the first application window is less than the window height of the first application window, displaying the landscape display resource of the first application in the first application window, while the mobile terminal is placed in the landscape direction, and displaying the first display resource of the second application in the second application window; and in response to that the window width of the first application window is greater than the window height of the first application window, displaying the portrait display resource of the first application in the first application window, while the mobile terminal is placed in the landscape direction, and displaying the first display resource of the second application in the second application window.

3. The method according to claim 1, wherein the landscape display resource comprises a landscape layout resource, a landscape position resource, or a landscape picture resource, and the portrait display resource comprises a portrait layout resource, a portrait position resource, or a portrait picture resource.

4. The method according to claim 1, wherein the first application has a second display attribute, and the second display attribute indicates that a display direction of the first application is not limited or is limited, and wherein the method further comprises:

determining, if the second display attribute of the first application indicates that the display direction of the first application is not limited, that the first application can be displayed in a landscape mode or in a portrait mode.

5. The method according to claim 1, wherein the method further comprises:

adjusting a size of the second application window if the first display attribute of the second application indicates that the display direction of the second application is limited, and a limited display direction of the second application is a landscape direction, wherein the window width of the second application window in a placement direction of the mobile terminal is greater than the window height of the second application window in the placement direction of the mobile terminal.

6. A mobile terminal comprising: at least one processor, a display screen, a memory, and a bus, wherein the display screen comprises at least a first application window and a second application window, and the memory stores programming instructions for execution by the at least one processor to:

simultaneously display, by the mobile terminal, the first application window and the second application window on the display screen and wherein the first application window and the second application window do not overlap on the display screen, wherein the mobile terminal is placed in a portrait direction, the display screen comprises a short side and a long side, and an extension direction of the short side is perpendicular to an extension direction of the long side; and perform at least one of the following:

in response to that a window width of the first application window is greater than a window height of the first application window, display a landscape display resource of a first application in the first application window and in response to that a window width of the second application window is less than a window height of the second application window, display a first display resource of a second application in the second application window, wherein the window width of the first application window is a projection length of the first application window in the short side of the display screen, the window height of the first application window is a projection length of the first application window in the long side of the display screen, wherein the window width of the second application window is a projection length of the second application window in the short side of the display screen, the window height of the second application window is a projection length of the second application window in the long side of the display screen, and the mobile terminal is placed in the portrait direction; or in response to that the window width of the first application window is less than the window height of the first application window, display a portrait display resource of the first application in the first application window and in response to that the window width of the second application window is greater than the window height of the second application window, display the first display resource of the second application in the second application window, wherein a display resource of the portrait display resource is different from a display resource of the landscape display resource, and the mobile terminal is placed in the portrait direction; and wherein the second application has a first display attribute, and the first display attribute includes a first flag and a second flag, wherein a current value of the first flag indicates that a display direction of the second application is not limited and the current value of the first flag has been modified from a previous value, and wherein a current value of the second flag indicates that the display direction of the second application is limited to a portrait display direction or a landscape display direction and the second flag stores the previous value of the first flag.

7. The mobile terminal according to claim 6, wherein the programming instructions are for execution by the at least one processor to:
in response to that a placement direction of the mobile terminal changes from the portrait direction to a landscape direction, rotate the first application window and the second application window;
in response to that-the window width of the first application window is less than the window height of the first application window, display the landscape display resource of the first application in the first application window, while the mobile terminal is placed in the landscape direction, and display the first display resource of the second application in the second application window; and
in response to that the window width of the first application window is greater than the window height of the first application window, display the portrait display resource of the first application in the first application window, while the mobile terminal is placed in the landscape direction, and display the first display resource of the second application in the second application window.

8. The mobile terminal according to claim 6, wherein the landscape display resource comprises a landscape layout resource, a landscape position resource, or a landscape picture resource, and the portrait display resource comprises a portrait layout resource, a portrait position resource, or a portrait picture resource.

9. The mobile terminal according to claim 6, wherein the first application has a second display attribute, and the second display attribute indicates that a display direction of the first application is not limited or is limited, and wherein the programming instructions are for execution by the at least one processor to:
determine, if the second display attribute of the first application indicates that the display direction of the first application is not limited, that the first application can be displayed in a landscape mode or in a portrait mode.

10. The mobile terminal according to claim 6, wherein the programming instructions are for execution by the at least one processor to:
adjust a size of the second application window if the first display attribute of the second application indicates that the display direction of the second application is limited, and a limited display direction of the second application is a landscape direction, wherein the window width of the second application window in a placement direction of the mobile terminal is greater than the window height of the second application window in the placement direction of the mobile terminal.

11. A non-transitory computer readable storage medium storing one or more programs, the one or more programs including instructions, which, when executed by an electronic device with a display screen displaying a first application window and a second application window, cause the device to:
simultaneously display, by the electronic device, the first application window and the second application window on the display screen and wherein the first application window and the second application window do not overlap on the display screen, wherein the electronic device is placed in a portrait direction, the display screen comprises a short side and a long side, and an extension direction of the short side is perpendicular to an extension direction of the long side; and
performing at least one of the following:
in response to that a window width of the first application window is greater than a window height of the first application window, display a landscape display resource of a first application in the first application window and in response to that a window width of the second application window is less than a window height of the second application window, display a first display resource of a second application in the second application window, wherein the window width of the first application window is a projection length of the first application window in the short side of the display screen, the window height of the first application window is a projection length of the first application window in the long side of the display screen, wherein the window width of the second application window is a projection length of the second application window in the short side of the display screen, the window height of the second application window is a projection length of the second application window in the long side of the display screen, and the electronic device is placed in the portrait direction; or
in response to that the window width of the first application window is less than the window height of the first application window, display a portrait display resource of the first application in the first application window and in response to that the window width of the second application window is greater than the window height of the second application window, display the first display resource of the second application in the second application window, wherein a display resource of the portrait display resource is different from a display resource of the landscape display resource, and the electronic device is placed in the portrait direction; and
wherein the second application has a first display attribute, and the first display attribute includes a first flag and a second flag, wherein a current value of the first flag indicates that a display direction of the second application is not limited and the current value of the first flag has been modified from a previous value, and wherein a current value of the second flag indicates that the display direction of the second application is limited to a portrait display direction or a landscape display direction and the second flag stores the previous value of the first flag.

12. The non-transitory computer readable storage medium according to claim 11, wherein the instructions, when executed by the device, cause the device to:
in response to that a placement direction of the electronic device changes from the portrait direction to a landscape direction, rotate the first application window and the second application window;
in response to that the window width of the first application window is less than the window height of the first application window, display the landscape display resource of the first application in the first application window, while the electronic device is placed in the landscape direction, and display the first display resource of the second application in the second application window; and in response to that the window width of the first application window is greater than the window height of the first application window, display the portrait display resource of the first application in the first application window, while the electronic device is placed in the landscape direction, and display the first display resource of the second application in the second application window.

13. The non-transitory computer readable storage medium according to claim 11, wherein the landscape display resource comprises a landscape layout resource, a landscape position resource, or a landscape picture resource, and the portrait display resource comprises a portrait layout resource, a portrait position resource, or a portrait picture resource.

14. The non-transitory computer readable storage medium according to claim 11, wherein the instructions, when executed by the device, cause the device to:

adjust a size of the second application window if the first display attribute of the second application indicates that the display direction of the second application is limited, and a limited display direction of the second application is a landscape direction, wherein the window width of the second application window in a placement direction of the electronic device is greater than the window height of the second application window in the placement direction of the electronic device.

* * * * *

UNITED STATES PATENT AND TRADEMARK OFFICE
CERTIFICATE OF CORRECTION

Page 1 of 1

PATENT NO. : 12,026,347 B2
APPLICATION NO. : 17/727286
DATED : July 2, 2024
INVENTOR(S) : Hui Yi It is certified that error appears in the above-identified patent and that said Letters Patent is hereby corrected as shown below:

In the Claims

In Column 25, In Line 23, In Claim 1, delete "direction," and insert -- direction; --.

In Column 27, In Line 19, In Claim 7, delete "that-the" and insert -- that the --.

Signed and Sealed this
Fifth Day of November, 2024

Katherine Kelly Vidal
*Director of the United States Patent and Trademark Office*